(12) United States Patent
Buchheit et al.

(10) Patent No.: US 9,344,673 B1
(45) Date of Patent: May 17, 2016

(54) ENHANCING A CAMERA ORIENTED USER INTERFACE VIA AN EYE FOCUS GUIDE

(71) Applicants: Brian K. Buchheit, Davie, FL (US); Satesh Ramcharitar, Hollywood, FL (US)

(72) Inventors: Brian K. Buchheit, Davie, FL (US); Satesh Ramcharitar, Hollywood, FL (US)

( * ) Notice: Subject to any disclaimer, the term of this patent is extended or adjusted under 35 U.S.C. 154(b) by 0 days.

(21) Appl. No.: 14/657,705

(22) Filed: Mar. 13, 2015

Related U.S. Application Data

(60) Provisional application No. 61/953,060, filed on Mar. 14, 2014.

(51) Int. Cl.
| | |
|---|---|
| G06F 3/00 | (2006.01) |
| G06F 3/01 | (2006.01) |
| H04N 7/14 | (2006.01) |
| H04N 5/232 | (2006.01) |
| H04N 7/15 | (2006.01) |

(52) U.S. Cl.
CPC .............. *H04N 7/144* (2013.01); *G06F 3/013* (2013.01); *H04N 5/23219* (2013.01); *H04N 7/15* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,606,390 | A | * | 2/1997 | Arai | G03B 13/02 396/51 |
| 2005/0243199 | A1 | * | 11/2005 | Bohaker | H04N 1/00127 348/373 |
| 2011/0164105 | A1 | * | 7/2011 | Lee | H04N 7/142 348/14.02 |
| 2011/0276445 | A1 | * | 11/2011 | Chess | G06Q 10/06 705/32 |
| 2013/0128229 | A1 | * | 5/2013 | Huang | G06K 9/46 351/239 |
| 2013/0201359 | A1 | * | 8/2013 | Wu | H04N 5/23219 348/222.1 |
| 2015/0189178 | A1 | * | 7/2015 | Lombardi | H04N 5/232 348/207.99 |

* cited by examiner

*Primary Examiner* — Joseph J Nguyen
(74) *Attorney, Agent, or Firm* — Patents on Demand P.A.; Brian K. Buchheit; Scott M. Garrett (57) ABSTRACT

An orientation of a computing device within three dimensional space can be determined. The position of a camera integrated within the device relative to the device screen. The camera can be a front facing camera or a rear facing camera. The camera can include an image sensor, a lense, and/or a shutter. A live view of a real world environment can be received from the camera and presented within the device screen within real-time. An eye guide can be simultaneously presented on the device screen to assist a user interacting with the device to focus the eyes of the user on the camera. The eye guide can be a graphical symbol and/or a text indicating a direction associated with the camera in relation to the orientation of the screen or the device. An image can be recorded within a computer readable storage medium associated with the device. The image can lack the eye guide.

15 Claims, 7 Drawing Sheets

Scenario 310

Photographer View 311

Subject View 351

ENHANCING A CAMERA ORIENTED USER INTERFACE VIA AN EYE FOCUS GUIDE

CROSS-REFERENCE TO RELATED APPLICATION

This application claims priority to the provisional application entitled "ENHANCING A CAMERA ORIENTED USER INTERFACE VIA AN EYE FOCUS GUIDE" filed Mar. 14, 2014 with Application No. 61/953,060, which is incorporated herein in its entirety.

BACKGROUND

The present invention relates to the field of self-portraiture and, more particularly, to enhancing a camera oriented user interface via an eye focus guide.

Many computing devices today include one or more cameras which allow users to capture photographs of themselves and their surrounding environment with the greatest of ease. Self-portraiture (e.g., selfies) have become a social norm and are often a form of social bonding. For example, a group of friends at a night club can take selfies of each other and the group and post it to social media websites to commemorate their night out. In many instances, pictures of group members and even the user can often appear to be awkward because the eye gaze of the subjects (e.g., group members, user) is not focused at directly forward (e.g., at the viewer of the picture).

BRIEF DESCRIPTION

The present disclosure is a solution for enhancing a camera oriented user interface via an eye focus guide. In the solution, a computing device with an integrated camera can present a live view within an interface of a display of the computing device. In one embodiment, an eye guide can be presented simultaneously with the live view within the interface. In the embodiment, the eye guide can direct a user eye gaze to the lense of the camera during media capture. In one configuration of the embodiment, the eye guide can be a transparent overlay which can assist a user during media capture (e.g., self-portraiture, group pictures).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
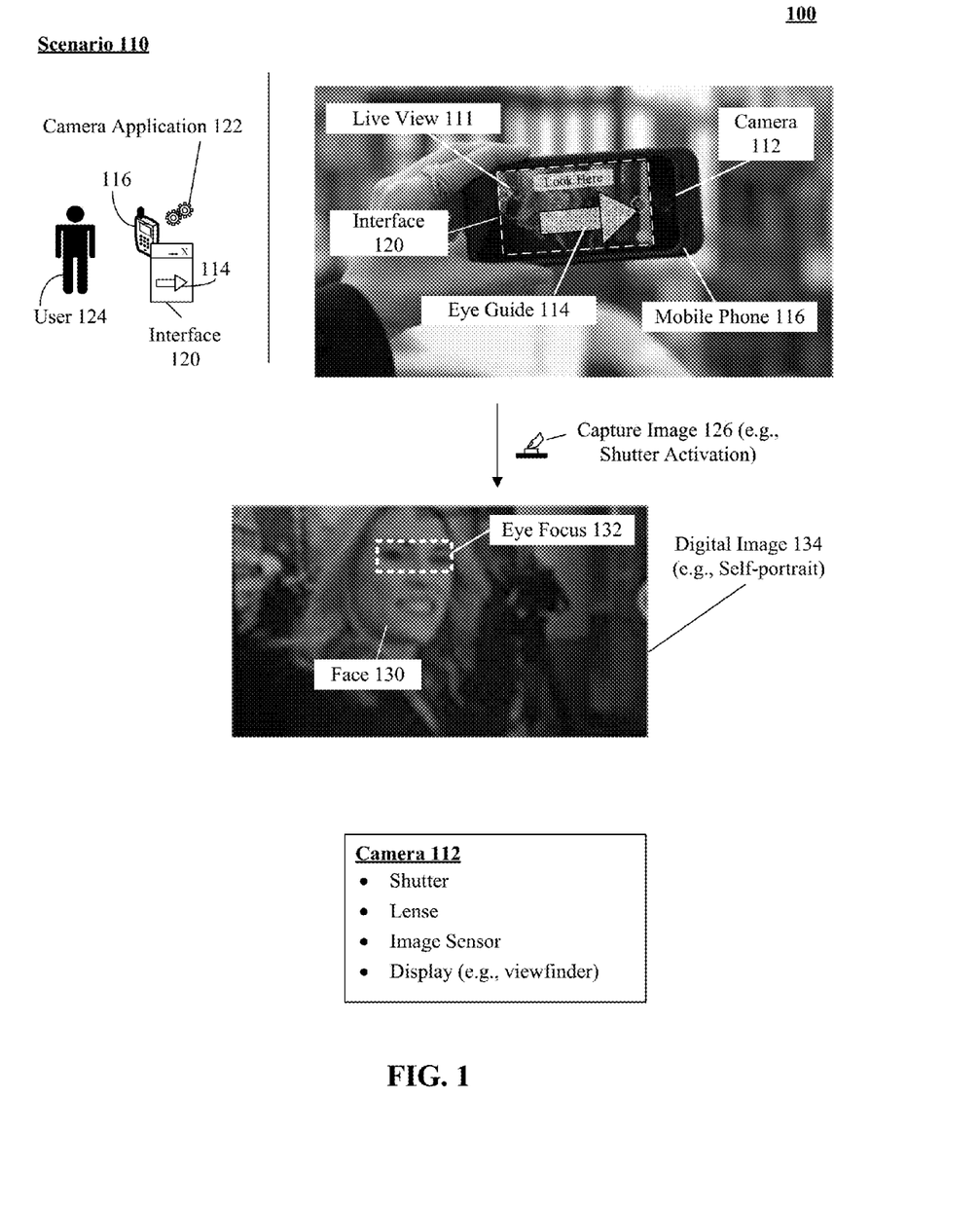
FIG. 1 is a schematic diagram illustrating a scenario for enhancing a camera oriented user interface via an eye focus guide an in accordance with an embodiment of the inventive arrangements disclosed herein.

FIG. 1 is a schematic diagram illustrating a scenario for enhancing a camera oriented user interface via an eye focus guide an in accordance with an embodiment of the inventive arrangements disclosed herein.

As used herein, camera 112 can be a optical instrument which can records media that can be stored directly or indirectly. Camera 112 can include, but is not limited to, a shutter, a lense, an image sensor, a display, and the like. Camera 112 can include, a digital single reflect lense (DSLR) camera, a digital point and shoot, a microelectromechanical (MEMS) camera, and the like. In one embodiment, camera 112 can be integrated or embedded into a computing device. In the embodiment, camera 112 can be a Complementary metal-oxide-semiconductor (CMOS) image sensor with a fixed focus lense. For example, camera 112 can be a component of a floating element group suspended by ceramic bearings and a small rare earth magnet. It should be appreciated that camera 112 can provide a live view 111 of a real world environment.

In scenario 110, a user interacting with a camera application 122 executing within mobile phone 116 can be assisted in recording a self-portrait digital image 134. In one embodiment, an interface for camera application 122 can utilize camera 112 to present a live view 111 of camera 112 view. In the embodiment, an eye guide 114 can be simultaneously presented to assist user 124 in directing the user's 124 eye focus 132 towards camera 112 during image 134 capture. For example, eye guide 114 can be presented within a camera application 122 interface 120 when the user starts an application 122 and is presented with a live view 111 from camera 112. In one instance, image 134 capture can be delayed for a suitable duration to enable the user 124 to focus their eyes on camera 112 (e.g., look at the lense of the camera). For example, a one second delay can be added to a camera application 122 functionality to permit user eye focus 132 to be directed at camera 112 prior to image 134 capture.

In one configuration, when user selects capture image action 126, eye guide 114 can be temporarily presented prior to digital image 134 being recorded. For example, user 124 can utilize camera 112 of phone 116 to take a "selfie" (e.g., self portrait). In the configuration, eye guide 114 can be presented within a transparent overly which can direct the user's gaze towards camera 112. For example, a phrase "look here" with a corresponding directional arrow pointing towards the camera can be presented prior to capture photograph 126 action. That is, eye guide 114 can help the user look directly into the lense of the camera 112 to permit the capture of a self portrait photograph in which the user 124 appears to be looking at a viewer when the photograph is viewed by a viewer. In one instance, the guide 114 can include a UNICODE arrow, a graphical symbol, a computer graphics, an audible sound (e.g., indicating direction), an audible sound (e.g., associated with a direction), a visible notification (e.g., a bright light), and the like.

It should be appreciated that the eye guide 114 can be temporarily presented for a duration which can be user configurable. In one instance, guide 114 can be presented along with a countdown timer which can prepare a user 124 for capture photograph 126 action. That is, the user 124 can be cued to focus gaze and/or attention on camera 112 permitting user's 124 face 130 and/or eye focus 132 to be appropriately captured within digital image 134.

In one embodiment, eye guide 114 can be dynamically and/or statically configured. In the embodiment, eye guide 114 can be configured to draw a user's 124 gaze (e.g., eye focus 132) to any point of interest. That is, guide 114 can be utilized to easily direct a user's 124 attention to permit the user 124 to capture their photographic intent. It should be appreciated that eye guide 114 can be a pop-up notification, an opaque overlay, and the like.

In one instance, eye guide 114 can lack directional information. In the instance, eye guide 114 can indicate to a user that eye focus can be directed at the camera. For example, guide 114 can be a text notification in the live view which indicates "Look at the camera when taking the picture".

Drawings presented herein are for illustrative purposes only and should not be construed to limit the invention in any regard. It should be appreciated that eye guide 114 does not appear in digital image 134. It should be understood that the disclosure can be utilized with add-on cameras, external flashes, and the like.

Figure 2:
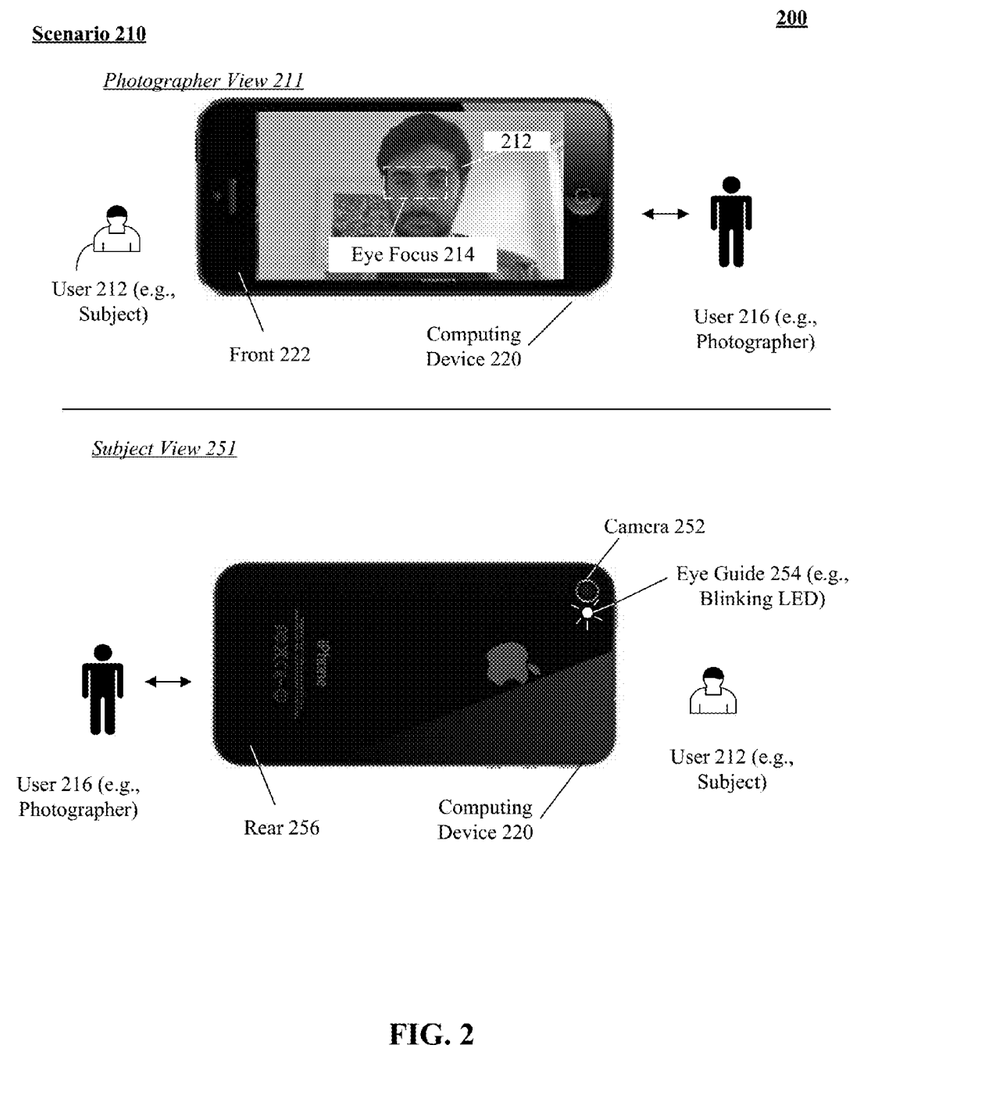
FIG. 2 is a schematic diagram illustrating a scenario for enhancing a camera oriented user interface via an eye focus guide an in accordance with an embodiment of the inventive arrangements disclosed herein.

FIG. 2 is a schematic diagram illustrating a scenario for enhancing a camera oriented user interface via an eye focus guide an in accordance with an embodiment of the inventive arrangements disclosed herein.

Scenario 210 can present a photographer view 211 and a subject view 251. The photographer view 211 can include the front 222 of device 220 and subject view 251 can include rear 256 of device 220. In scenario 210, a user 216 can utilize computing device 220 to take a picture of user 212 using camera 252 of device 220. Device 220 can include a front which can present a live preview of camera 252 view and a rear 256 which can include a camera 252 and a LED light (e.g., flash). In one embodiment, the disclosure can utilize device 220 to be configured to permit an LED associated with the device to function as an eye guide 254. In the embodiment, eye guide 254 can be utilized to draw user's 212 eye focus 214 to camera 252 area. For example, device 220 can trigger LED light to blink several times prior to capturing a photograph which can be utilized to draw user's 212 eye focus 214. That is, a photographer can tell the subject to look at the blinking light to easily direct subject eye focus with minimal effort.

Figure 3:
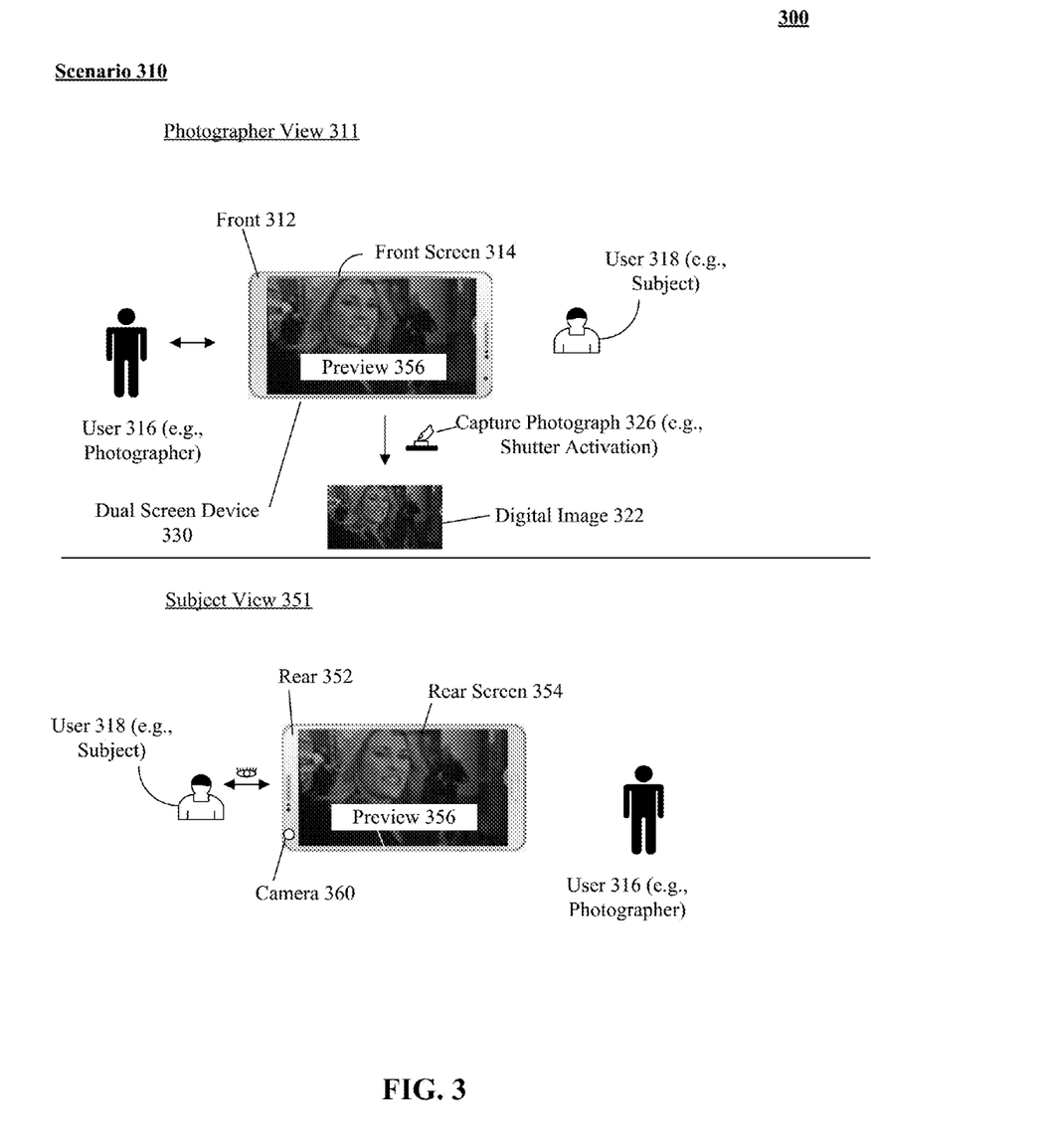
FIG. 3 is a schematic diagram illustrating a scenario for enhancing a camera oriented user interface via an eye focus guide an in accordance with an embodiment of the inventive arrangements disclosed herein.

FIG. 3 is a schematic diagram illustrating a scenario for enhancing a camera oriented user interface via an eye focus guide an in accordance with an embodiment of the inventive arrangements disclosed herein.

Scenario 310 can include a photographer view 311 and a subject view 351. The photographer view 311 can present the front screen 314 of dual screen device 330 and subject view 351 can present the rear screen 354 of device 330. In scenario 310, a user 316 can utilize dual screen device 330 to present a preview 356 of a digital photograph 322 captured by camera 360 on rear screen 354. For example, when a photographer (e.g., 316) performs capture photograph 326 action (e.g., shutter activation), a preview 356 can be presented on front screen 314 and rear screen 354 permitting both the photographer and the subject 318 to proof the photograph 322.

In one embodiment, an eye guide (e.g., 114) can be presented on rear screen 354 prior to capture photograph 326 action. In the embodiment, when a camera 360 is utilized by an application to provide a live view of camera 360 view, an eye guide can be presented. That is, rear screen 354 can present an eye guide for subject 318 to see which can guide subject 318's attention appropriately.

Figure 4:
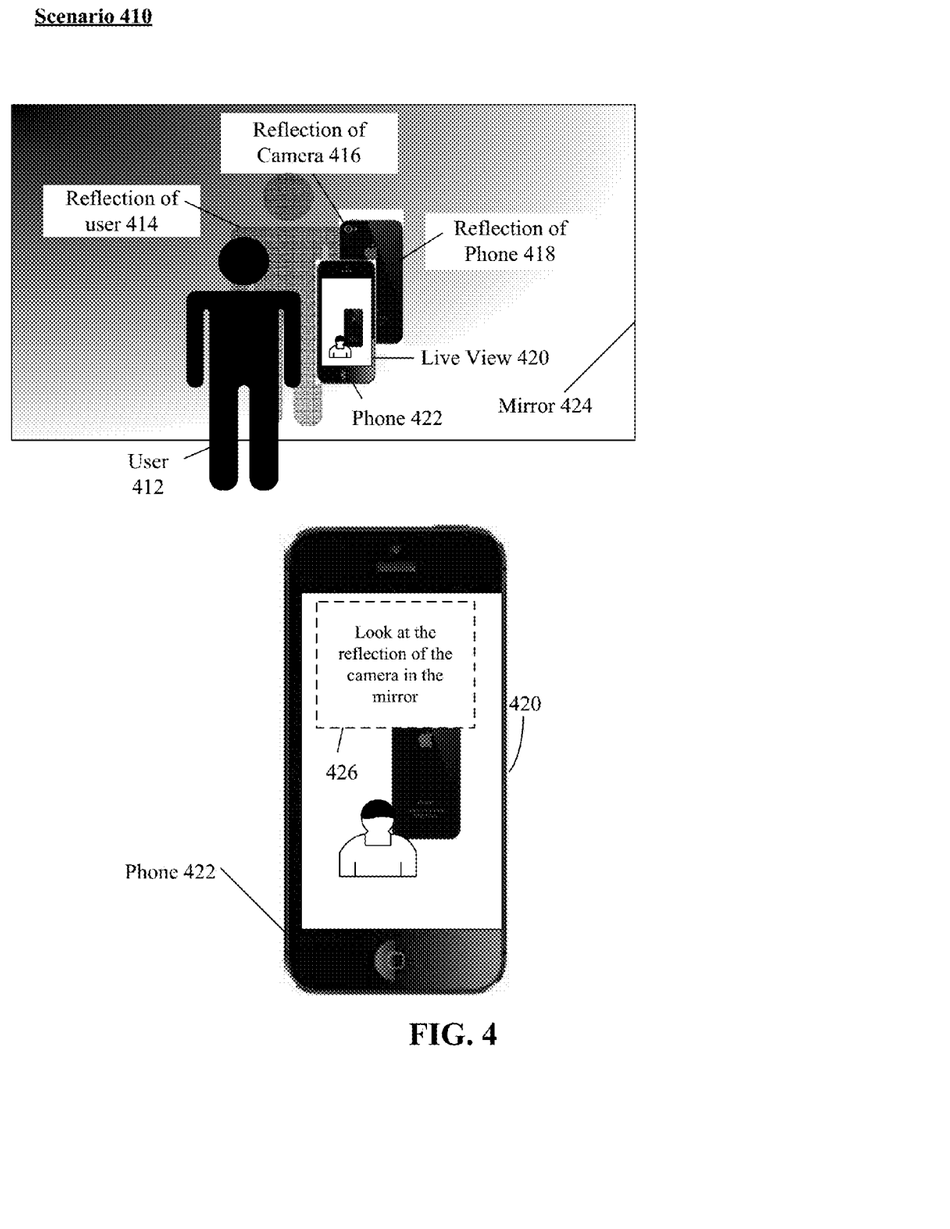
FIG. 4 is a schematic diagram illustrating a scenario for enhancing a camera oriented user interface via an eye focus guide an in accordance with an embodiment of the inventive arrangements disclosed herein.

FIG. 4 is a schematic diagram illustrating a scenario for enhancing a camera oriented user interface via an eye focus guide an in accordance with an embodiment of the inventive arrangements disclosed herein.

In scenario 410, a user 412 can utilize camera 416 of phone 422 to take a picture of themselves in a mirror 424 (e.g., selfie). Mirror 424 can produce reflection of user 414 and reflection of phone 418 which can be seen by user 412. Camera (not shown) of phone 422 can capture mirror 424 reflections such that phone 422 can present a live preview 420 of reflection of user 414, reflection of camera 416, and reflection of phone 418. In one embodiment, an eye guide 426 can be presented within preview 420 (e.g., as a transparent overlay) to direct user's gaze towards reflection of camera 416. For example, when a user 412 attempts to compose a photograph with phone 422, eye guide 426 can assist in simplifying eye focus since user 412 can be easily confused where their gaze should be directed towards. In one embodiment, camera LED (not shown) can be utilized to direct the user's attention to reflection of camera 416 within mirror 424. For example, camera LED can blink intermittently during photograph composition or can produce an colored light which can draw the user's eye gaze/attention. It should be appreciated that the disclosure can be configured to not interfere with LED's traditional functionality (e.g., as a flash). That is, during photograph capture, LED can be utilized as a strobe flash to increase the light within a photograph as it has traditionally.

In one embodiment, disclosure can permit phone 422 to detect a self portrait photograph taken with a mirror. In the embodiment, the disclosure can permit the photograph to be automatically inverted along a vertical axis (e.g., unmirrored).

Figure 5:
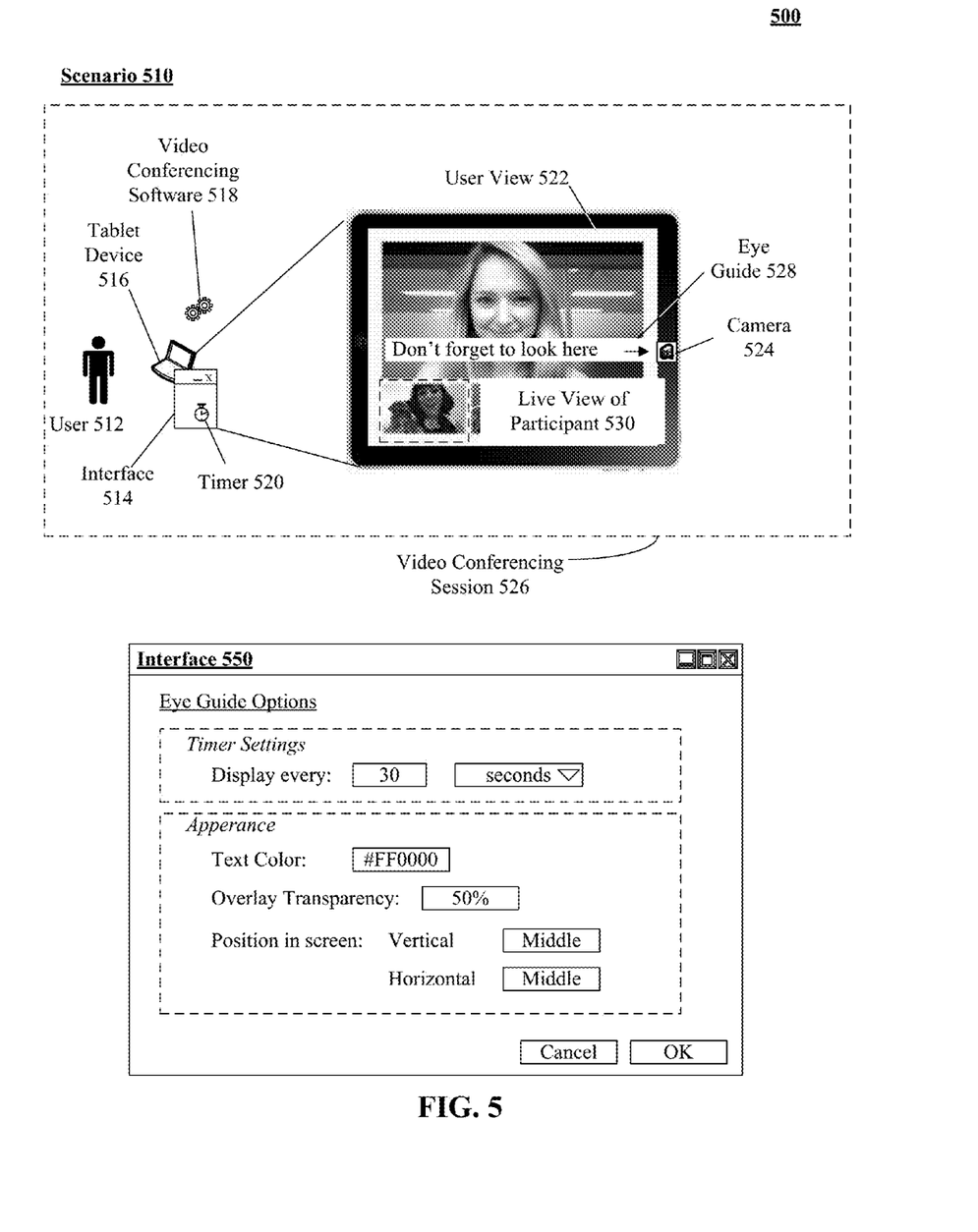
FIG. 5 is a schematic diagram illustrating a scenario for enhancing a camera oriented user interface via an eye focus guide an in accordance with an embodiment of the inventive arrangements disclosed herein.

FIG. 5 is a schematic diagram illustrating a scenario for enhancing a camera oriented user interface via an eye focus guide an in accordance with an embodiment of the inventive arrangements disclosed herein.

In scenario 510, a user 512 can interact with a tablet device 516 executing video conferencing software 518 to participate in a video conferencing session 526. Software 518 can present a user view 522 within interface 514 which can include one or more live views 530 (e.g., real-time or near real-time) of participants 526. Device 516 can include a camera 524 which can capture a live view of user 512 for session 526. In one embodiment, eye guide 528 can be intermittently presented during session 526 to remind user 512 to direct their gaze to camera 524. In the embodiment, guide 528 can reinforce social norms (e.g., such as eye contact) to help participants in session 526 communicate more naturally and efficiently.

In one embodiment, a timer 520 can be utilized to control eye guide 528 presentation and persistence (e.g., duration). In one configuration of the embodiment, timer 520 can be a global timer (e.g., for the session), which can keep track of elapsed time and at intervals (e.g., every 5 minutes), can trigger eye guide 528 to be presented. In another configuration of the embodiment, timer 520 can be utilized to help the user 512 hold "eye contact" with a participant for an appropriate duration of time (e.g., one second). That is, timer 520 can function as a threshold causing eye guide 528 to be continuously presented until user 512 eye focus is detected for the minimum threshold (e.g., two seconds).

It should be appreciated that focus/gaze detection can be performed utilizing traditional and/or proprietary mechanisms.

It should be appreciated that disclosure can leverage existing session timers (e.g., call duration time).

Figure 6:
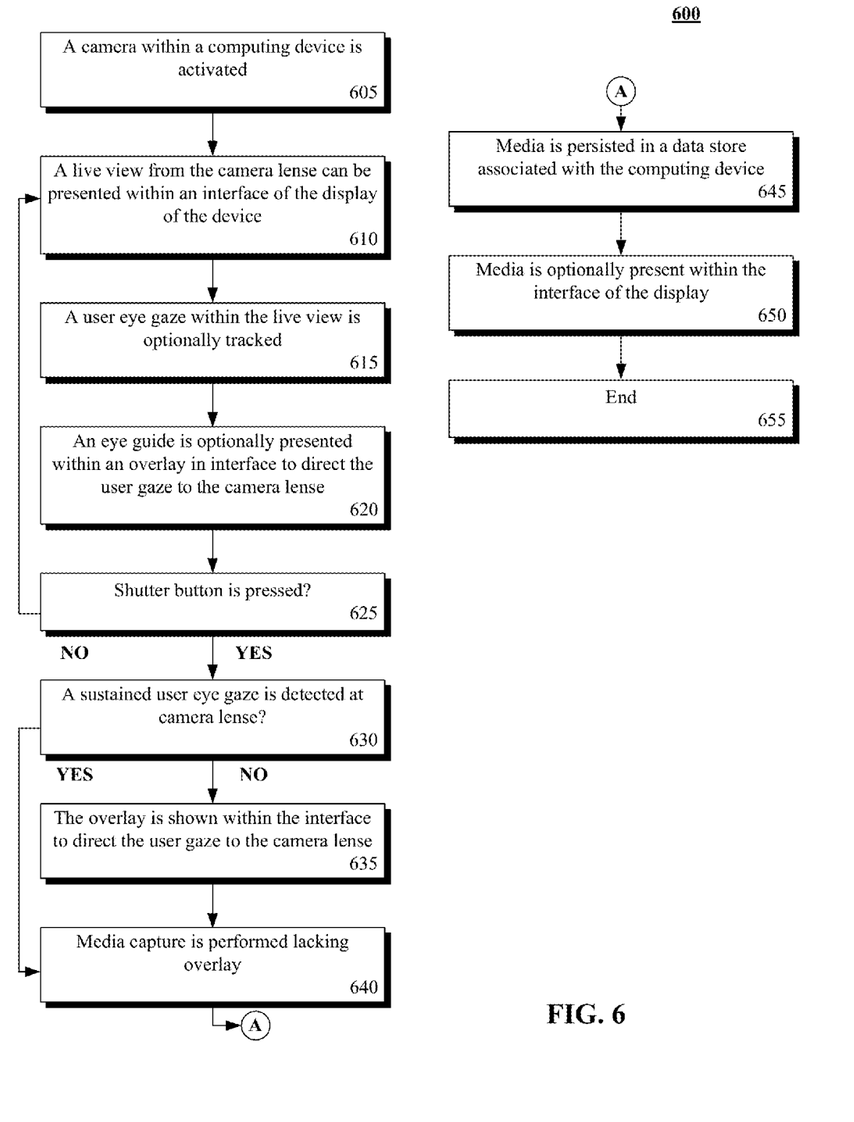
FIG. 6 is a flowchart illustrating a method for enhancing a camera oriented user interface via an eye focus guide an in accordance with an embodiment of the inventive arrangements disclosed herein.

FIG. 6 is a flowchart illustrating a method for enhancing a camera oriented user interface via an eye focus guide an in accordance with an embodiment of the inventive arrangements disclosed herein.

In step 605, a camera within a computing device can be activated. In step 610, a live view from the camera lense can be presented within an interface of the display of the device. In step 615, a user eye gaze can within the live view can be optionally tracked. In step 620, an eye focus guide can be optionally presented within an overlay in the interface to direct the user eye gaze to the camera lense. In step 625, if the shutter button is pressed, the method can continue to step 630, else return to step 610. In step 630, if a sustained user eye gaze is detected at camera lense, the method can continue to step 640, else proceed to step 635. In step 635, the overlay can be presented within the interface to direct the user gaze to the camera lense. In step 640, a media capture can be performed by the camera lacking the user eye guide overlay. In step 45, the media can be persisted within a data store associated with the computing device. In step 650, the media can be optionally presented within the interface of the display. In step 655, the method can end.

Drawings presented herein are for illustrative purposes only and should not be construed to limit the invention in any regard. It should be appreciated that method 600 can be performed in real-time or near real-time. Further, method 600 can be performed in serial and/or in parallel. In one embodiment, method 600 can be performed when a self-portrait mode is activated. In another embodiment, steps of method 600 can be performed when a front facing camera is activated. It should be appreciated that method 600 can include optional steps and can include additional steps.

Figure 7:
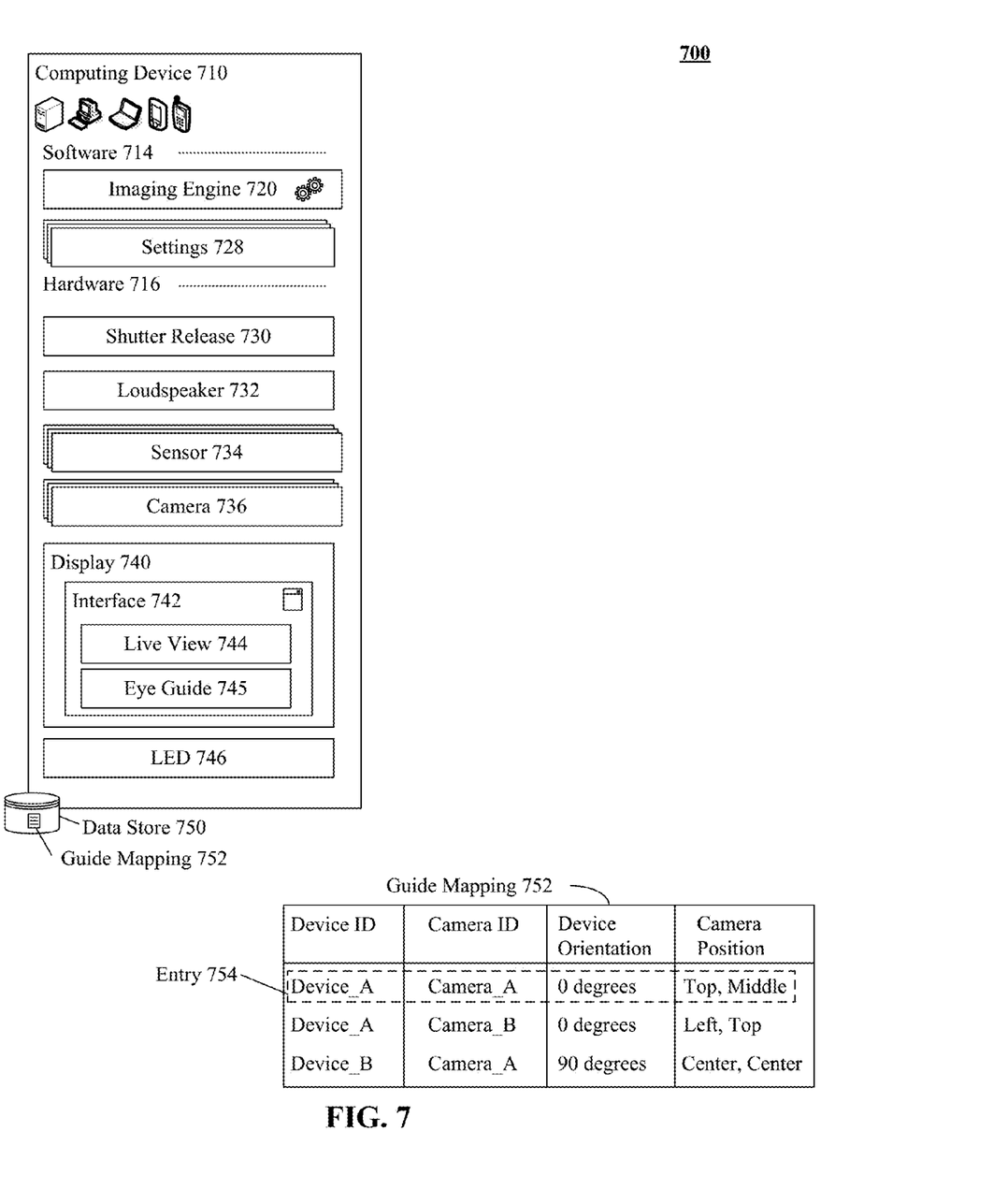
FIG. 7 is a schematic diagram illustrating a system for enhancing a camera oriented user interface via an eye focus guide an in accordance with an embodiment of the inventive arrangements disclosed herein.

FIG. 7 is a schematic diagram illustrating a system for enhancing a camera oriented user interface via an eye focus guide an in accordance with an embodiment of the inventive arrangements disclosed herein.

Computing device 710 can be a hardware/software element for presenting view 744 and/or eye guide 745. Device 710 can include, but is not limited to, software 714, hardware 714, and the like. Software 714 can include, but is not limited to, imaging engine 720, settings 728, and the like. Hardware 716 can include, but is not limited to, a shutter release 730, one or more input/output components (e.g., microphone, loudspeaker 732, touchscreen, on-screen keyboard), a sensor 734 (e.g., accelerometer), a camera 736, display 740, interface 742, Light Emitting Diode (LED) 746, and the like. In one instance, device 710 can be communicatively linked to a server which can perform one or more the functionalities of the disclosure.

Guide mapping 752 can be a data set for enabling eye focus guide within the system 700 and/or device 710. Mapping 752 can include, but is not limited to, a device identifier, a camera identifier, a device orientation, a camera location, and the like. In one instance, an entry 754 can associate a camera position within a specific device based on the device orientation. In the instance, device identifier can include, but is not limited to, a device manufacturer (e.g., SAMSUNG, APPLE), a device model (e.g., iPHONE, NOTE), a device make (e.g., 6 PLUS, S6), and the like. In the instance, camera identifier can include, but is not limited to, a logical identifier (e.g., front, rear), a media access control (MAC) identifier, an Internet Protocol address (IP), a canonical identifier, a user established identifier, and the like. In one embodiment, device orientation can include vertical and/or horizontal orientation in a three dimensional space. In one configuration of the embodiment, a reference orientation normal to the ground can be established for the vertical orientation and/or a horizontal orientation. For example, when a user is holding a mobile phone in their hand (e.g., 0 degrees) and rotates (e.g., 90 degrees) the phone sideways to take a selfie, an orientation from the reference orientation can be determined. In one embodiment, camera position can include a coordinate pair/triplet value, an alphanumeric value, a numeric value, and the like. For instance, a camera position can be established for every orientation, enabling a suitable eye guide to be presented regardless of the phone orientation to the user.

In one embodiment, the disclosure can be utilized within the film making industry where camera focus from one or more actors within a scene is vital. In the embodiment, one or more audible or visible eye guides can be presented during media capture. In one instance, multiple eye guides can be utilized to assist multiple users in directing eye focus to a particular point of interest.

It should be appreciated that the disclosure can include one or more networks. Networks can be an electrical and/or computer network connecting one or more system 700 components. Networks can include, but is not limited to, twisted pair cabling, optical fiber, coaxial cable, and the like. Networks can include any combination of wired and/or wireless components. Networks topologies can include, but is not limited to, bus, star, mesh, and the like. Networks types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that components 714-746 can be an optional components of device 710. It should be appreciated that one or more components within system 700 can be optional components permitting that the disclosure functionality be retained.

The flowchart and block diagrams in the FIGS. 1-7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a self-portraiture enhancement comprising:
   determining an orientation of a computing device within three dimensional space; establishing the position of a camera integrated within the device relative to the device screen, wherein the camera is at least one of a front facing camera and a rear facing camera, wherein the camera comprises of at least one of an image sensor, a lense, and a shutter;
   receiving a live view of a real world environment from the camera and presenting the live view within the device screen within real-time;
   simultaneously presenting an eye guide on the device screen to assist a user interacting with the device to focus the eyes of the user on the camera, wherein the eye guide is at least one of a graphical symbol and a text indicating a direction associated with the camera in relation to the orientation of the screen or the device and the eye guide further comprises of a composition grid, wherein the composition grid comprises of at least two vertical lines and at least two horizontal lines which intersect forming at least nine bounded regions within the screen; and
   recording an image within a non-transitory computer readable storage medium associated with the device, wherein the image lacks the eye guide.

2. The method of claim 1, wherein when the view of the user strays from the camera, presenting the eye guide on the device screen.

3. The method of claim 1, further comprising:
   presenting a notification light prior to capturing the image, wherein the notification light aids in directing the attention of a subject within the live view to a point of interest, wherein the notification light is an Light Emitting Diode of the device.

4. The method of claim 1, further comprising:
   detecting a self-portrait image capture being performed with a front facing camera of the device; and
   presenting the eye guide within the screen of the device.

5. The method of claim 1, further comprising:
   detecting a self-portrait image capture being performed with a rear facing camera, wherein the live view comprises of a reflection of a user; and
   responsive to capturing the image, inverting the image along a vertical axis.

6. The method of claim 1, further comprising:
   analyzing the image to determine the eye focus of a subject within the image;
   when the eye focus of the subject within in the image does not correspond to a previously established point of interest; and
   presenting an option to re-record the image.

7. The method of claim 1, further comprising:
   analyzing the image to determine the eye focus of the subject;

when the eye focus of the subject within in the image does not correspond to the point of interest;
presenting an option to re-adjust the image.

8. The method of claim 1, further comprising:
establishing an area around the eyes of the subject within the image; and
applying an overlay onto the area to at least partially obscure the area.

9. The method of claim 1, further comprising:
when a shutter activation is detected, delaying the shutter activation for a previously established duration; and
activating a Light Emitting Diode of the device for the previously established duration.

10. A system for enhancing self-portrait image capture comprising:
an imaging engine executing within a computing device, wherein the computing device comprises of an integrated camera, wherein the camera comprises of at least one of an image sensor, a lense, and a shutter, wherein the imaging engine is configured to present a live view from the lense of the camera within an interface of a display of the computing device, wherein the imaging engine simultaneously presents an eye guide within the interface, wherein the eye guide is a graphical symbol indicating the direction of the camera in relation to at least one of the display and the orientation of the device and the eye guide further comprises of a composition grid, wherein the composition grid comprises of at least two vertical lines and at least two horizontal lines which intersect forming at least nine bounded regions within the screen;
a data store able to persist at least one of the eye guide, an image obtained from the camera image sensor, a guide mapping, and an eye guide setting, wherein the image lacks the eye guide, wherein the guide mapping indicates at least one of an absolute and relative location of the integrated camera within the device.

11. The system of claim 10, wherein the graphical symbol is at least one UNICODE arrow.

12. The system of claim 10, further comprising:
responsive to a shutter actuation, dismissing the eye guide.

13. The system of claim 10, further comprising:
tracking the eye gaze of a user interacting within the interface; and
when the eye gaze is directed towards the camera for a previously established threshold of time, automatically capturing an image.

14. The system of claim 10, further comprising:
obtaining an approximate orientation reading from an accelerometer within the computing device;
based on the approximate orientation, presenting an appropriate eye guide within the interface.

15. The system of claim 10, wherein the imaging engine is configured to automatically invert at least one of the live view and an image captured from the image sensor of the camera along a vertical axis, wherein the image lacks the eye guide.

* * * * *